(12) United States Patent
Morikawa et al.

(10) Patent No.: US 12,100,522 B2
(45) Date of Patent: Sep. 24, 2024

(54) APPARATUS AND METHOD FOR VOLUME REDUCTION FOR NUCLEAR DECOMMISSIONING AND REFURBISHMENT

(71) Applicant: ATS Corporation, Cambridge (CA)

(72) Inventors: David Taro Morikawa, Cambridge (CA); Mark Johannesson, Cambridge (CA); Matthew Wong, Cambridge (CA)

(73) Assignee: ATS CORPORATION, Cambridge (CA)

( * ) Notice: Subject to any disclaimer, the term of this patent is extended or adjusted under 35 U.S.C. 154(b) by 527 days.

(21) Appl. No.: 17/218,037

(22) Filed: Mar. 30, 2021

(65) Prior Publication Data

US 2021/0304910 A1 Sep. 30, 2021

Related U.S. Application Data

(60) Provisional application No. 63/002,910, filed on Mar. 31, 2020.

(51) Int. Cl.
| | |
|---|---|
| *G21C 19/36* | (2006.01) |
| *B23K 26/08* | (2014.01) |
| *B23K 37/053* | (2006.01) |

(52) U.S. Cl.
CPC ............ *G21C 19/36* (2013.01); *B23K 26/08* (2013.01); *B23K 37/0533* (2013.01)

(58) Field of Classification Search
CPC ............ B23K 26/08; B23K 37/0211; B23K 37/0241; B23K 37/027; B23K 37/0276; B23K 37/0288; B23K 37/0533; B23K 37/053; G21C 19/36; G21D 1/003; G21F 9/28; Y02E 30/00; Y02E 30/30
See application file for complete search history.

(56) References Cited

U.S. PATENT DOCUMENTS

| | | | | |
|---|---|---|---|---|
| 4,317,021 A | * | 2/1982 | Walch | B23K 26/10 |
| | | | | 219/121.74 |
| 4,568,814 A | * | 2/1986 | Hamasaki | G21F 9/34 |
| | | | | 376/310 |

(Continued)

FOREIGN PATENT DOCUMENTS

| | | | | | |
|---|---|---|---|---|---|
| EP | 2881215 B1 | * | 5/2016 | ......... | B21C 37/0807 |
| ES | 2529355 T3 | * | 2/2015 | ........... | B23D 59/006 |

(Continued)

OTHER PUBLICATIONS

Mallion et al., Waste Management Conference, 2017 pp. 1043-1053, ISSN 0275-6196 (abstract).

(Continued)

*Primary Examiner* — Dana Ross
*Assistant Examiner* — Adam M Eckardt
(74) *Attorney, Agent, or Firm* — Valauskas Corder LLC (57) ABSTRACT

An apparatus for volume reduction of material removed from a hazardous environment. The apparatus includes a shielded housing for receiving a workpiece therein, at least one cutting unit having a cutting head operable for contactless cutting, and a drive unit for rotating the at least one cutting unit around a main axis so the cutting head cuts the workpiece.

20 Claims, 9 Drawing Sheets

(56) References Cited

U.S. PATENT DOCUMENTS

| | | | | |
|---|---|---|---|---|
| 5,685,996 A | * | 11/1997 | Ricci | B23K 10/00 |
| | | | | 219/60 A |
| 2008/0121628 A1 | * | 5/2008 | Yamazaki | B23K 37/0533 |
| | | | | 219/121.82 |
| 2015/0048059 A1 | * | 2/2015 | Kurosawa | G21C 17/017 |
| | | | | 219/76.14 |
| 2020/0398384 A1 | * | 12/2020 | Wang | B23Q 3/064 |

FOREIGN PATENT DOCUMENTS

| | | | | |
|---|---|---|---|---|
| JP | 2004212149 | A | * | 7/2004 |
| JP | 2007010443 | A | * | 1/2007 |
| JP | 2015500745 | A | * | 1/2015 |
| RU | 2709187 | C1 | * | 12/2019 |

OTHER PUBLICATIONS

OC Robotics, Nov. 2016 (Nov. 2016), (abstract) [online] [retrieved on May 7, 2021 (Jul. 5, 2021)). Retrieved from the Internet <https://www.ocrobotics.com/lasersnake2--news-a-world-first--laser-cutting-for-nuclear-decommissioning-at-sellafield/>.
Search Report & Written Opinion, Canadian Patent Office (Gatineau, Quebec), May 10, 2021.

* cited by examiner

APPARATUS AND METHOD FOR VOLUME REDUCTION FOR NUCLEAR DECOMMISSIONING AND REFURBISHMENT

CROSS REFERENCE TO RELATED APPLICATIONS

This application claims the benefit of U.S. Provisional Patent Application No. 63/002,910, filed Mar. 31, 2020, the contents of which are hereby incorporated by reference.

FIELD

The disclosure herein relates to decommissioning and refurbishment of material in a hazardous environment, and in particular to apparatuses and methods for volume reduction of equipment and other material (for example pipes and piping components) removed from a nuclear environment.

INTRODUCTION

Equipment or material located in a hazardous environment (such as a nuclear reactor) may need to be removed when the environment is decommissioned or refurbished. For example, a decision may be made to decommission a nuclear reactor. In the reactor, various materials will have been highly irradiated, such as pressure tubes, calandria tubes, or other piping components. Removal of these irradiated materials is generally necessary so that the site can be cleaned up and contamination reduced. Removal of these irradiated materials is a challenging and difficult exercise. For instance, manual removal of material can expose workers to significant doses of radiation, limiting their ability to work safely and the amount of time they can spend working on site.

Moreover, any irradiated materials that are removed from a hazardous environment should be stored in shielded waste containers, for example to protect personnel, the environment and the like. However, the costs of shielded waste containers tend to be quite high and can represent a significant portion of the cost of any decommissioning or refurbishment activity. Hence, reducing the volume of the irradiated components after they are removed can be beneficial to reducing the amount of shielded waste containers that are necessary for a particular decommissioning or refurbishment application.

Some current approaches to volume reduction are known. One approach simply involves manual volume reduction, for example with human operators using saws and the like to cut up pipes and other workpieces. However, this exposes workers to significant risks of radiation exposure from the irradiated materials, limiting the workers ability to work safely and the amount of time they can spend working.

Another approach uses hydraulic systems to reduce volume of the irradiated components. For example, high strength presses (i.e., two 150 ton opposed cylinders) can be used to volume reduce irradiated components by crushing components. However, such an approach can be slow, with mechanical wear leading to limited life, and depends on high tonnage forces and a sizable hydraulic system to operate.

SUMMARY

According to some aspects, an apparatus for volume reduction of material removed from a hazardous environment, having a shielded housing for receiving a workpiece therein, at least one cutting unit having a cutting head operable for contactless cutting, and a drive unit for rotating the at least one cutting unit around a main axis so the cutting head cuts the workpiece.

In some aspects, an end of the apparatus includes an opening that is sized and shaped to receive the workpiece therein. The opening may be sufficiently small so as to impede egress of irradiated materials from within the apparatus during and after cutting of the workpiece.

In some aspects, the apparatus may further include an end portion rotatably coupled to the shielded housing. The end portion may have a ring gear, the drive unit is coupled to the shielded housing, and the ring gear may be operable to engage with the drive unit to rotate the end portion relative to the shielded housing.

In some aspects, the apparatus may further comprise at least one axial drive unit for moving the cutting head axially within the housing. In some aspects, each cutting unit may include a geared portion sized and shaped to engage with a drive gear on at least one of the axial drive units to convert rotary motion of the drive gear into linear axial motion of the cutting head.

In some aspects, the apparatus may have a clamping system for securing the workpiece within the shielded housing during cutting.

In some aspects the apparatus may have a link mechanism for maintaining the cutting head in a constant standoff relative to the workpiece.

In some examples, the hazardous environment is a nuclear facility.

In some examples, the workpiece is an irradiated workpiece.

In some aspects, the at least one cutting head includes a laser cutter.

In some aspects, the at least one cutting head incudes a plasma torch.

In some aspects, the at least one cutting head includes two cutting heads.

In some aspects, the drive unit is operable to rotate the at least one cutting unit in a first direction and a second direction.

According to another aspect, a method of volume reducing an irradiated workpiece, including receiving the irradiated workpiece within a shielded housing, and rotating at least one cutting unit around a main axis so that a contactless cutting head cuts the irradiated workpiece.

In some aspects, the method may further include clamping the irradiated workpiece within the shielded housing during cutting. The method may also include unclamping the irradiated workpiece after cutting, and collecting a cut workpiece in a shielded waste container.

The method may include moving the cutting head axially within the shielded housing. The method may include moving the cutting head radially during axial movement thereof to maintain a constant standoff between the workpiece and the cutting head.

BRIEF DESCRIPTION OF THE DRAWINGS

The drawings included herewith are for illustrating various examples of systems, methods, and apparatus of the present specification. In the drawings.

DETAILED DESCRIPTION

Various apparatus or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The teachings herein generally relate to apparatus and methods of volume reduction for use with irradiated materials (i.e., workpieces) removed from hazardous locations, for instance in nuclear facilities.

In particular, some of the volume reducing apparatus and methods described herein may be suitable for use with refurbishment or decommissioning of highly irradiated workpieces, such as pressure tubes, calandria tubes, or other piping components.

According to some aspects, an apparatus incorporating some of the teachings herein may be capable of providing a non-contact, high-speed, highly reliable system in a compact footprint. In general, the apparatus may be self-shielded and highly robust. Such an apparatus may be suitable as a replacement for legacy existing refurbishment techniques (where increasing cycle time or speed is desired by stakeholders), or in decommissioning or refurbishing where reducing the quantity of waste containers is an economic advantage.

According to some aspects, an apparatus incorporating some of the teachings herein can cut irradiated waste into smaller portions that can be more densely packed, thus reducing the storage volume and number of waste containers. In some embodiments, the cutting can be done using contactless techniques. Such contactless techniques could include lasers. One contactless technique may include plasma cutters, or other similar cutting techniques.

In some embodiments, at least some cutting could be done using contacting cutting members, such as a reciprocating saw or linear saw.

According to some aspects, an apparatus that incorporates some of the teachings described herein can be used to cut various types of irradiated materials, such as pipes, and other similar products. Some apparatus may be sized and shaped to cut other shapes, such as flat products.

Apparatus that incorporate some of the teachings here may be suitable as a replacement for existing CANDU volume reduction presses. Unlike the use of presses, however, such apparatus may be operable to cut materials (i.e., pipes) in a non-contact manner. Moreover, such apparatus may not require extremely high tonnage forces, may eliminate intricate and failure prone die sets, may eliminate the need for hydraulics, may provide for higher volume reduction, higher reliability, higher processing rate, and a significantly smaller footprint. In some cases, this may be done at comparable or even reduced costs.

Figure 1:
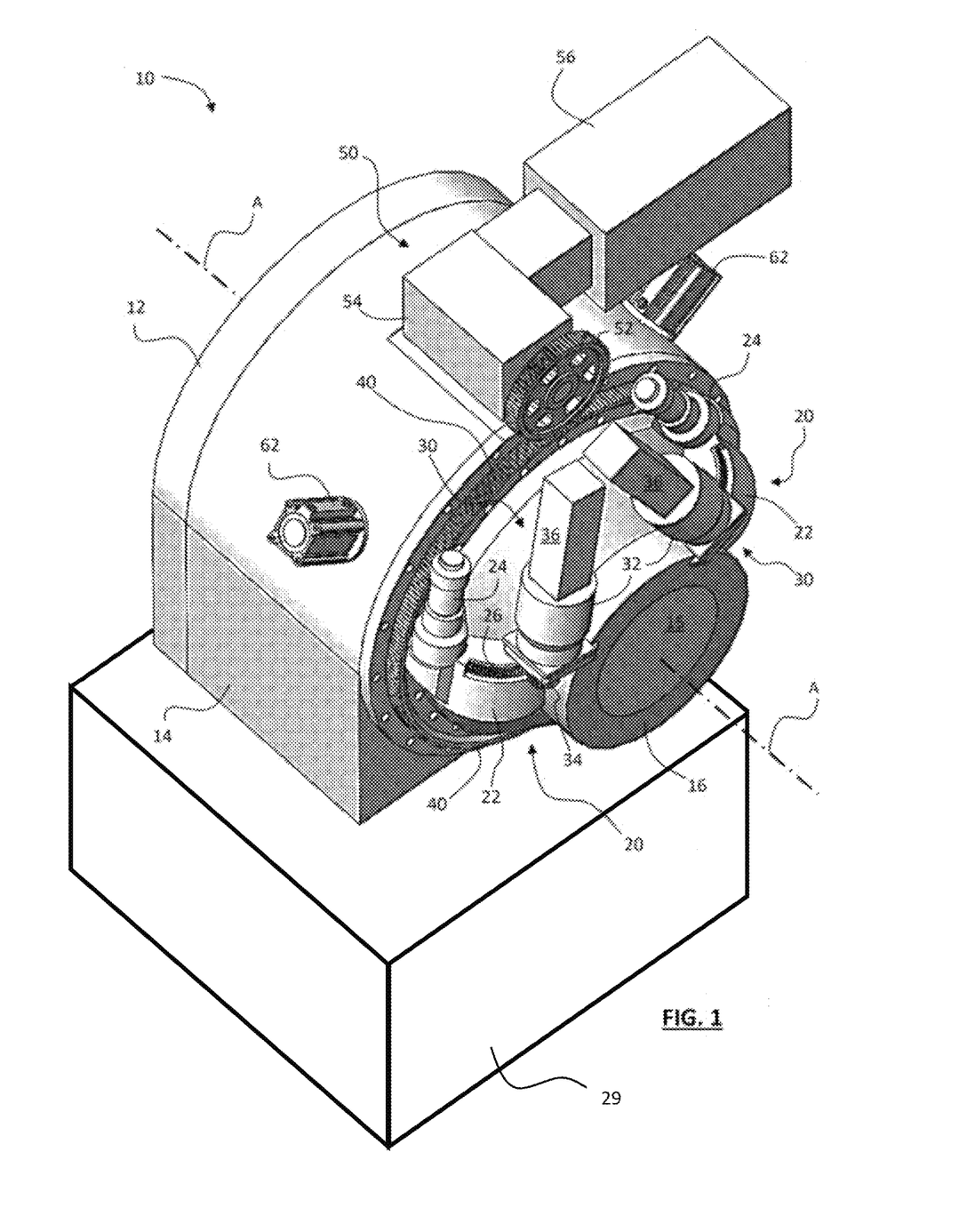
FIG. 1 is a front perspective view of a volume reduction apparatus according to some embodiments.

Referring now to FIG. 1, illustrated therein is a volume reduction apparatus 10 according to one embodiment. The apparatus 10 generally includes a front plate 12 that is shielded and provides shielding of irradiated components therein and containment of contamination. In particular, the front plate 12 is sized and shaped to receive a workpiece W (such as an irradiated pipe) for cutting.

The front plate 12 may be supported by a housing 14. In some cases, the housing 14 could be mounted to a workbench or other surface during use. In some cases, the housing 14 could be mounted above a shielded waste container 29. The housing 14 provides shielding for irradiated components therein and containment of contamination.

Figure 4:
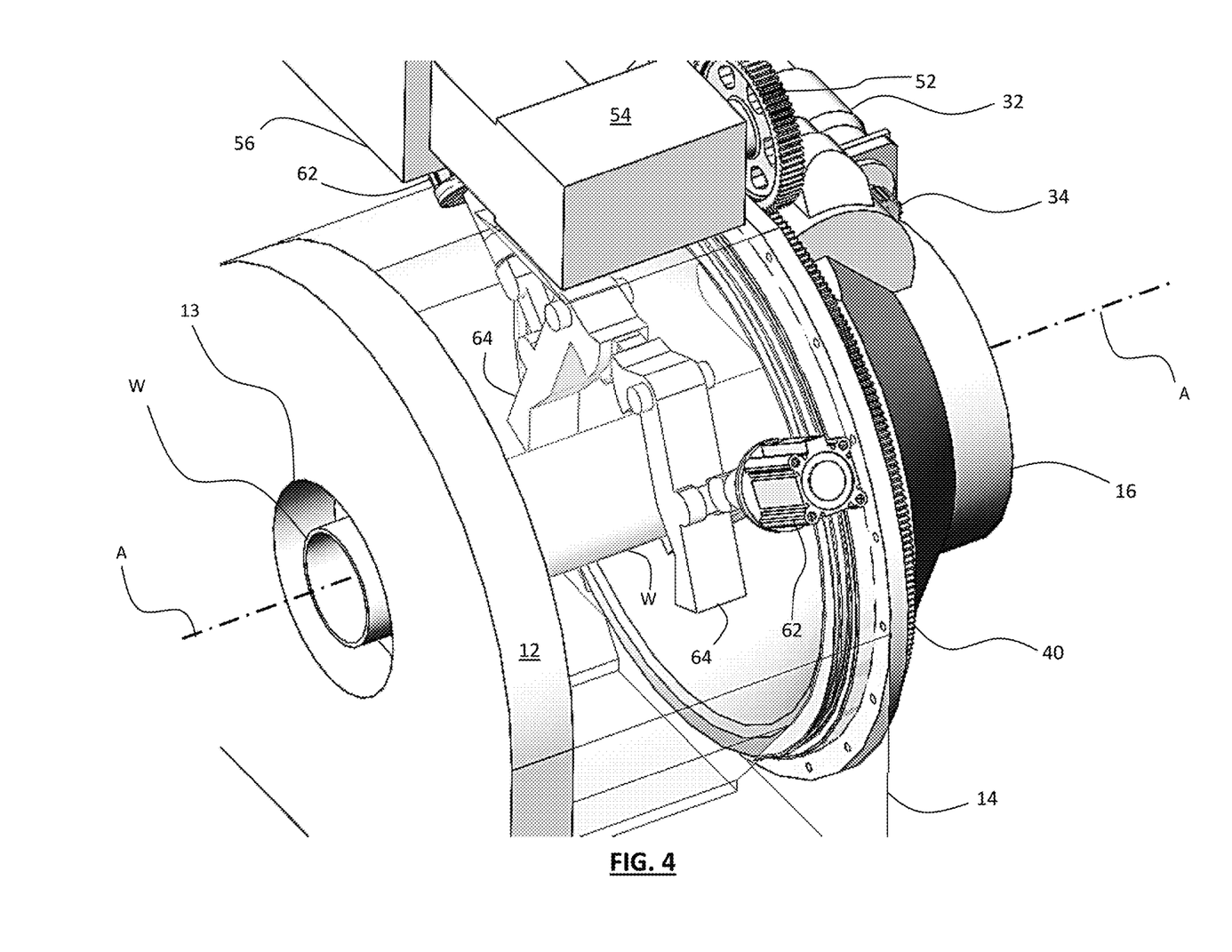
FIG. 4 is a rear perspective view of the apparatus of FIG. 1 showing a clamping system for engaging with a workpiece within the apparatus.

As shown in FIG. 4, the rear end of the apparatus 10 includes an opening 13 that is sized and shaped to receive the workpiece W along a main axis A, for example using existing workpiece feed techniques (i.e., axial pipe feeding methods).

In particular, the opening 13 may be circular and with a diameter sufficiently large so as to accommodate the diameter of a workpiece W, particularly a pipe. In some embodiments, the opening 13 should be sufficiently small that it serves as an impediment to egress of materials (such as irradiated particles) from within the apparatus 10 during and after cutting of the workpiece.

As shown in FIG. 1, the front end of the apparatus 10 includes an end portion 16, which may also be shielded, and that is operable to rotate with respect to the housing 14 as will be detailed herein.

In some embodiments, the end portion 16 includes an end cap 15 that securely seals the end portion 16 so as to inhibit the egress of irradiated particles within the housing 14. In some embodiments, the end cap 15 may be removable. This may be useful, for example, to access the interior of the housing 14 to service the apparatus 10. For instance, it may be desirable to replace or inspect the laser cutting heads within the apparatus 10. It may also be desirable to access the interior of the apparatus 10 to remove jams or cut pieces of the workpiece W.

Figure 7:
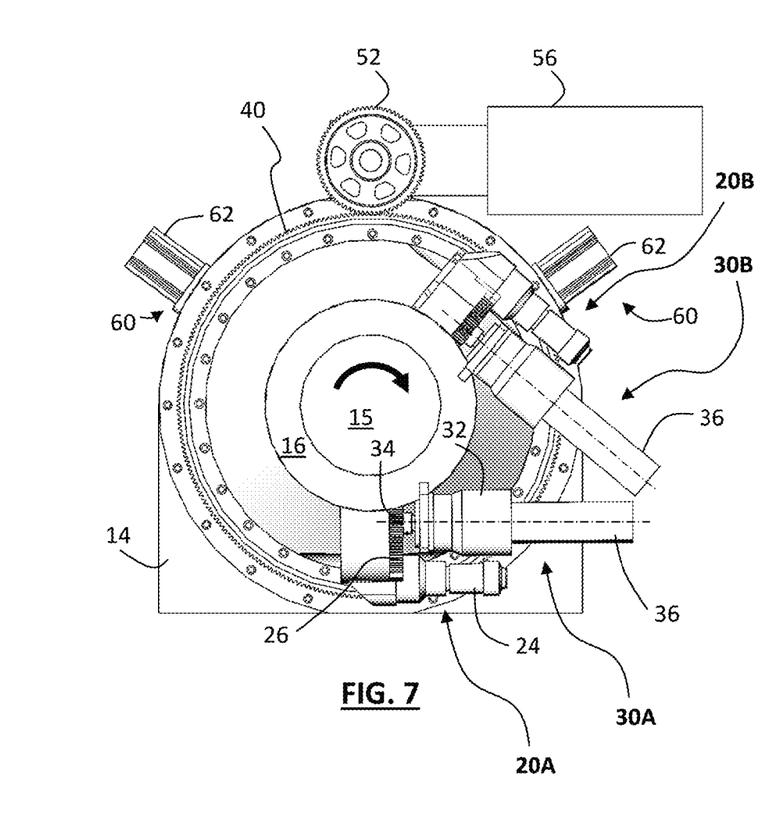
FIG. 7 is a first front end view of the apparatus of FIG. 1 showing cutting units rotated into a first clockwise position.
Figure 8:
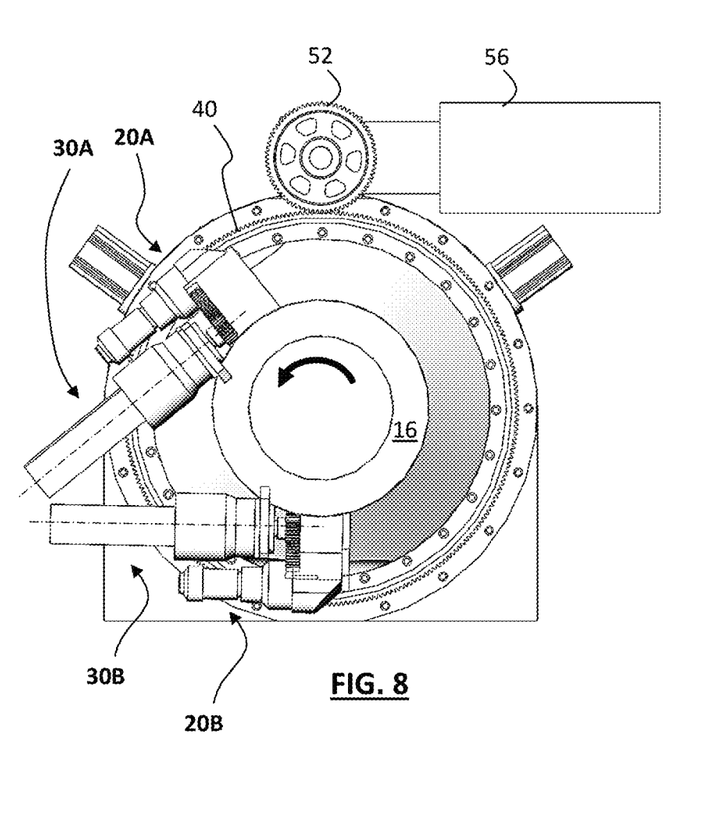
FIG. 8 is a second front end view of the apparatus of FIG. 1 showing cutting units rotated into a second counter-clockwise position.

As shown, the apparatus 10 includes one or more cutting units 20. In this specific embodiment the apparatus 10 includes two cutting units 20 (see in particular FIGS. 7 and 8 showing cutting units 20A and 20B). The cutting units 20 are generally operable to rotate about the main axis A, thus circumnavigating the workpiece W within the apparatus 10 so that the cutting head 21 can cut the workpiece W.

The use of two or more cutting units 20 generally allows a workpiece W to be cut more quickly (as opposed to the use of a single cutting unit 20).

The apparatus 10 also includes one or more axial drive units 30. In this specific embodiment, the apparatus 10 includes two axial drive units 30 (see in particular FIGS. 7 and 8 showing axial drive units 30A and 30B).

As shown, the axial drive units 30 and cutting heads 20 are secured to and supported by the end portion 16 of the apparatus 10. Moreover, the axial drive units 30 cooperate with and drive the cutting units 20 to provide axial motion of the cutting heads 21 (generally along the main axis A) within the apparatus 10, as will be described further herein.

Figure 2:
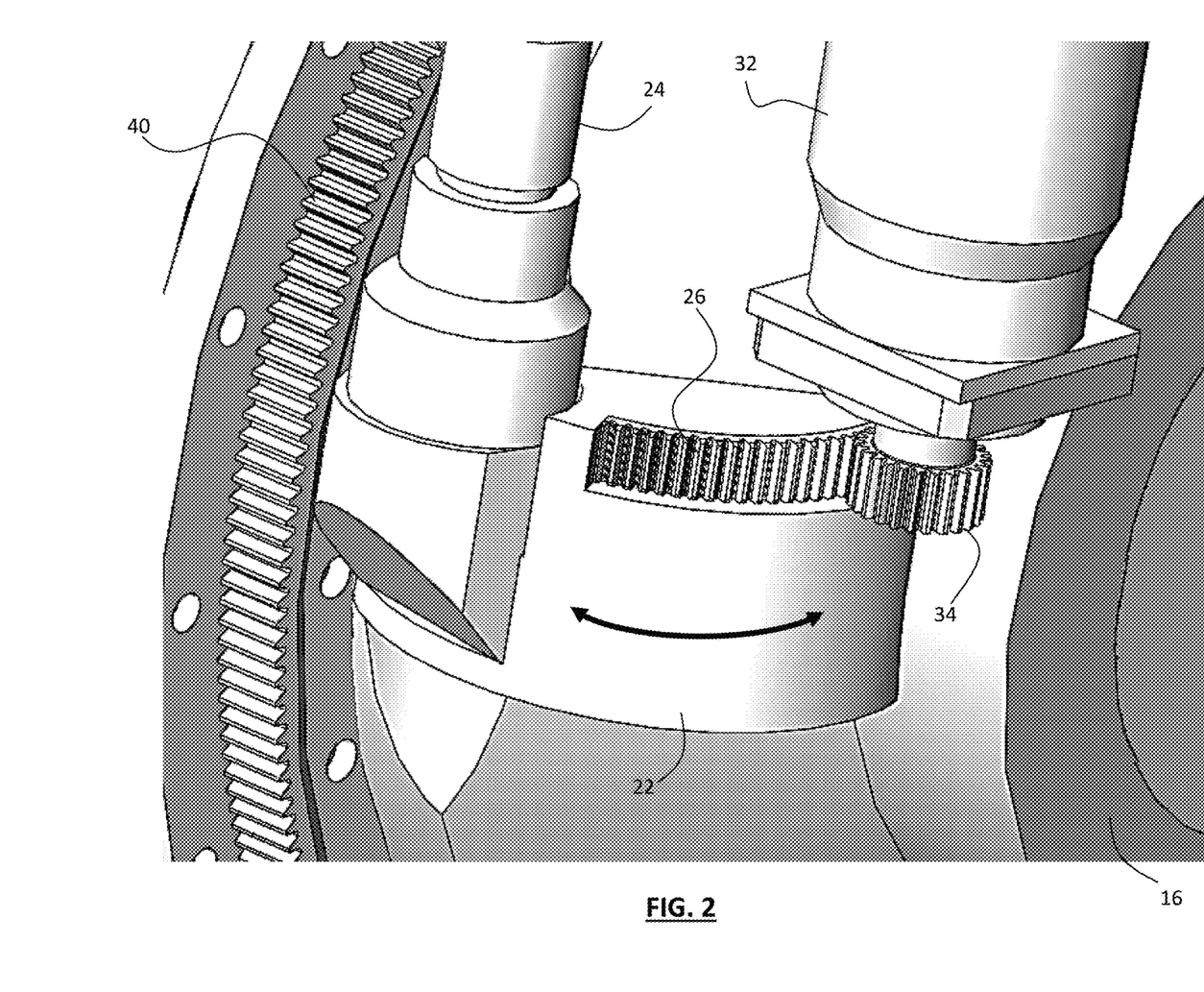
FIG. 2 is a close-up perspective view of a portion of a cutting unit of the apparatus of FIG. 1.

In particular, as shown each cutting unit 20 includes a movable puck 22, which provides shielding, and that supports a cutter housing 24. The puck 22 has a geared portion 26, which meshes with a drive gear 34 on the axial drive unit 30 (see in particular FIG. 2). Each drive gear 34 may be driven by a gearhead 32 and drive motor 36.

Figure 5:
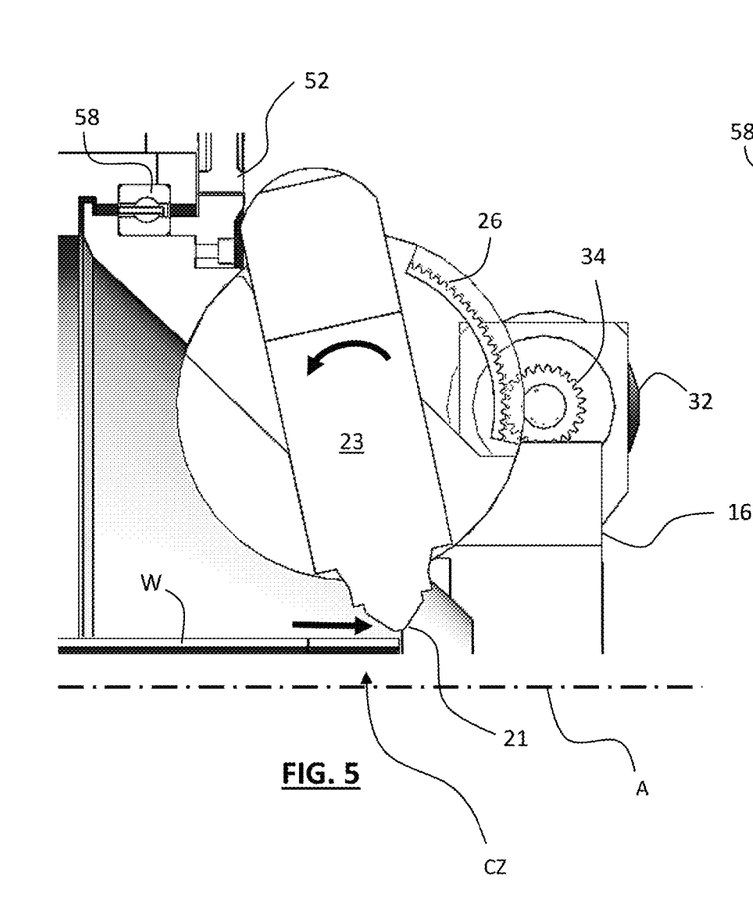
FIG. 5 is a first cross-sectional view of the apparatus of FIG. 1 aligned with the workpiece axis and showing the cutting unit pivoted forward to a first position.
Figure 6:
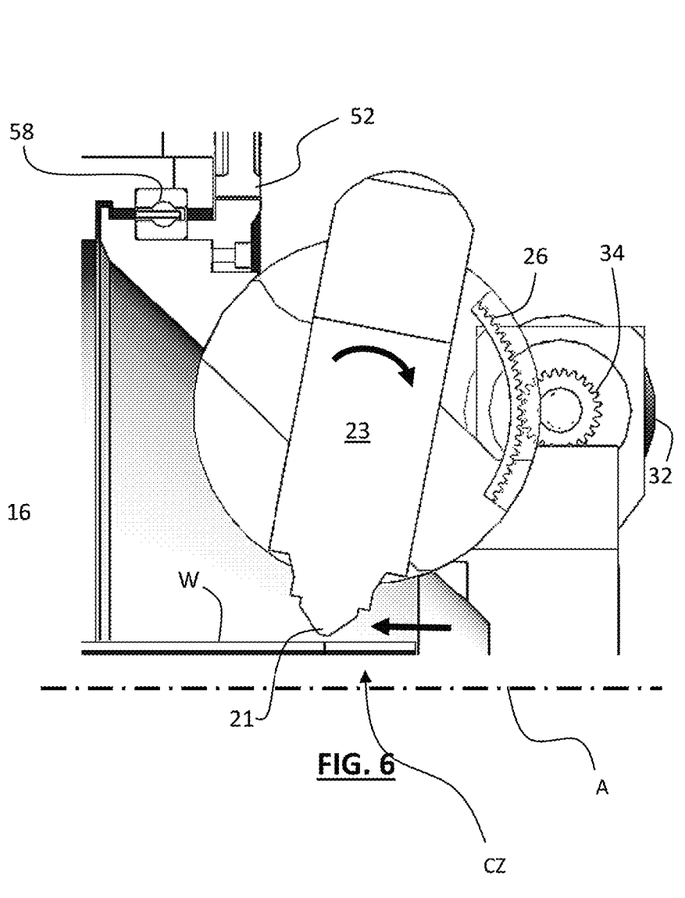
FIG. 6 is a second cross-sectional view of the apparatus of FIG. 1 aligned with the workpiece axis and showing the cutting head pivoted rearward to a second position.

As shown in FIGS. 5 and 6, for instance, each cutting unit 20 includes a cutting head 21 and cutting body 23 located within the apparatus 10. The cutting head 21 has a cutting tip (i.e., a laser or other contactless cutter) that is close to the workpiece W and which is designed to cut the workpiece W within a cutting zone (designated generally as CZ).

As the drive motor 36 of the axial drive unit 30 turns the drive gear 34, the corresponding geared portion 26 of the cutting unit 20 is driven (shown counterclockwise in FIG. 5, and clockwise in FIG. 6). This in turn moves the cutting head 21 (and hence the laser) either forward towards the end portion 16 (as shown in FIG. 5) or rearward towards the opening 13 (as shown in FIG. 6).

By pivoting the puck 22 back and forth through a short angle in this manner, axial motion of the laser cutting head 21 along the main axis A is achieved using the rotary motion of the drive motor 36. Using this rotary motion eliminates the need to generate an axial sliding motion outside of the apparatus 10 and transfer that motion within the apparatus 10 (and hence eliminates the accompanying complications with respect to shielding (which is particularly important when working with irradiated materials) and other drive system components). Moreover, this helps improve speed by reducing mass, since high-speed movements require high acceleration.

Figure 3:
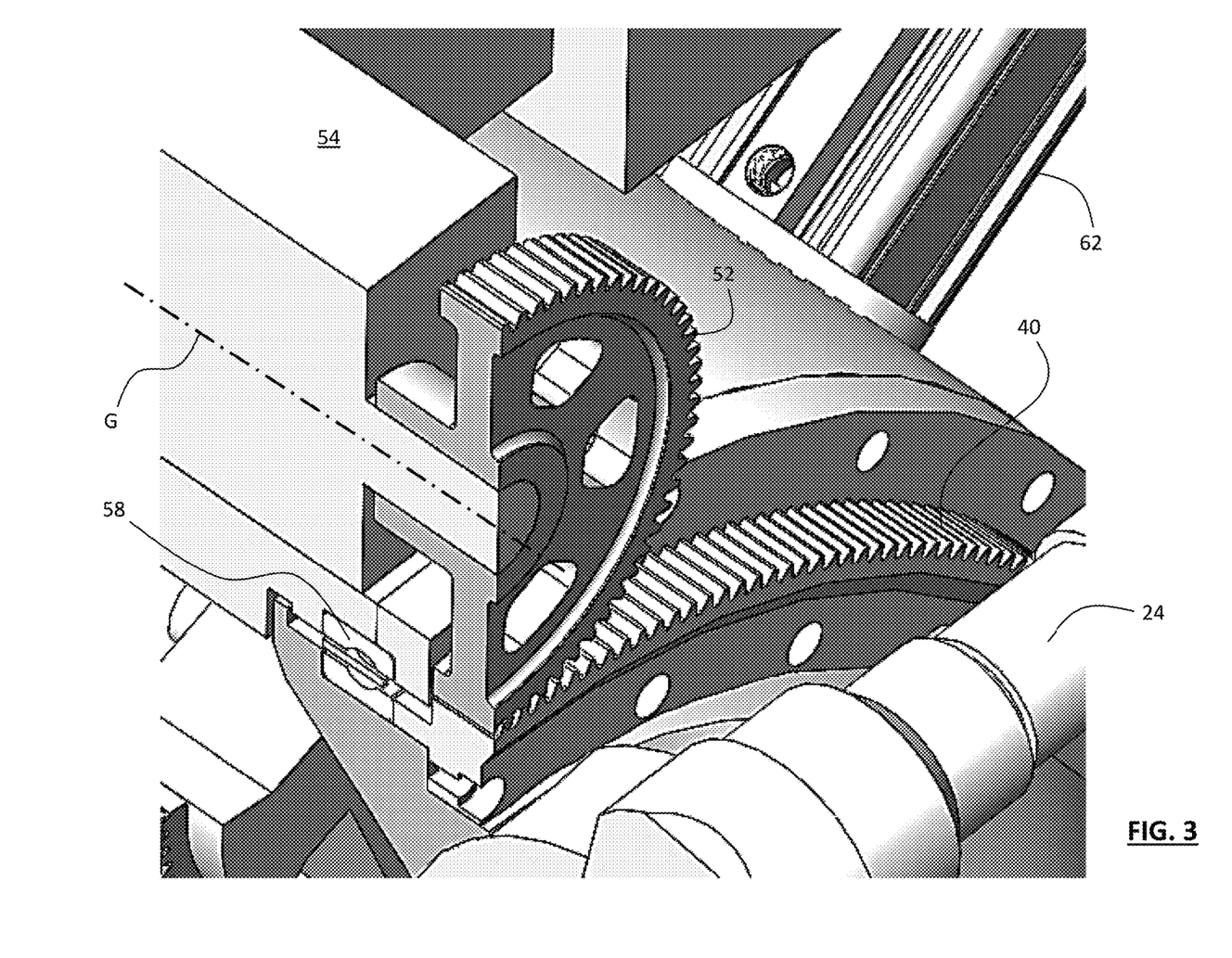
FIG. 3 is a close-up perspective view of a drive system of the apparatus of FIG. 1 for rotating the cutting unit around a workpiece.

Turning now to FIGS. 1 and 3, the rotation of the cutting units 20 about the main axis A will now be described in greater detail. In particular, the end portion 16 is rotatable with respect to the housing 14, and the end portion 16 includes a ring gear 40 on the exterior thereof. As shown in FIG. 3, the end portion 16 may be supported by a four-point contact bearing 58 to facilitate rotation thereof.

As shown, a main drive unit 50 is mounted on top of the housing 14 of the apparatus 10. The main drive unit 50 includes a main gear 52 (that rotates about a gear axis G) than meshes with the ring gear 40 on the end portion 16 (see in particular FIG. 3). The main gear 52 is driven by a gearhead 54 and a main motor 56 (which could for example be a servomotor).

When the main motor 56 is activated, the end portion 16 (and along with it the cutting units 20 and axial drive units 30) can be rotated around the main axis A. In this manner, the cutting heads 21 can be using to circumnavigate the workpiece.

This is shown, for example, in FIGS. 7 and 8. In FIG. 7, the main motor 56 has been activated to drive the end portion 16 clockwise, with a first cutting unit 20A and axial drive unit 30A located towards the bottom of the apparatus 10 (i.e., near the housing 14), and a second cutting unit 20B and second axial drive unit 30B located towards the top of the apparatus 10 (i.e., near the main gear 52).

Conversely, in FIG. 8, the main motor 56 has been used to drive the end portion counter-clockwise, with the first cutting unit 20A and first axial drive unit 30A located towards the top of the apparatus 10 (i.e., near the main gear 52), and the second cutting unit 20B and second axial drive unit 30B located towards the bottom of the apparatus 10 (i.e., near the housing 14).

In some embodiments, the positions shown in FIGS. 7 and 8 may represent the rotational limits of the end portion 16. In particular, this may be as far as the end portion 16 can be rotated, since the axial drive units 30 and/or cutting units 20 might otherwise contact a worktable or ground surface on which the housing 14 of the apparatus 10 is placed. As such, cutting a workpiece W may require rotation of the end portion 16 in alternating first and second directions.

In another embodiment, the end portion 16 may be sized and shaped such that it can be rotated continuously in one or both directions (i.e., past 360 degrees of rotation).

Figure 9:
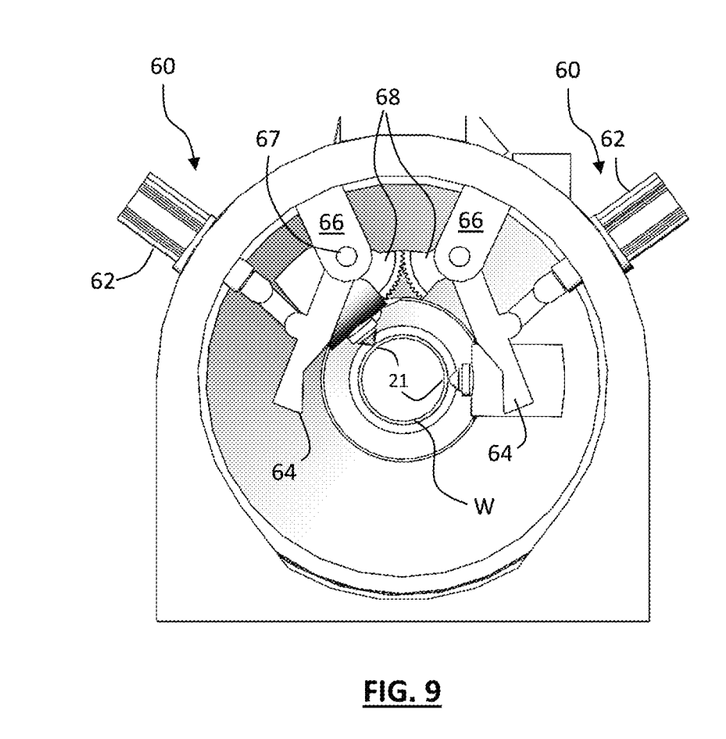
FIG. 9 is a first rear view of the apparatus of FIG. 1 showing the workpiece within the apparatus, the cutting heads of the cutting units adjacent the workpiece, and clamps open and not contacting the workpiece.
Figure 10:
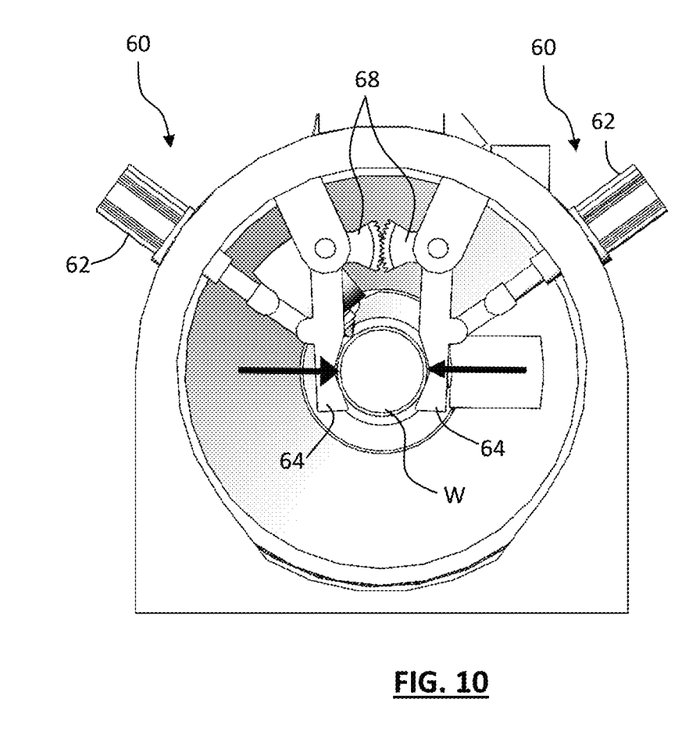
FIG. 10 is a second rear view of the apparatus of FIG. 9 showing the clamps closed and contacting the workpiece.
Figure 11:
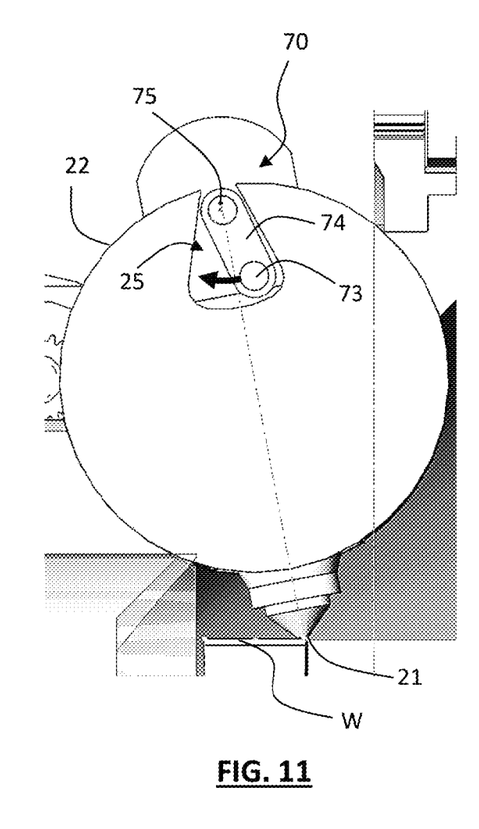
FIG. 11 is a first detailed view of a link mechanism for maintaining the cutting head in a constant standoff relative to the workpiece according to one embodiment.
Figure 12:
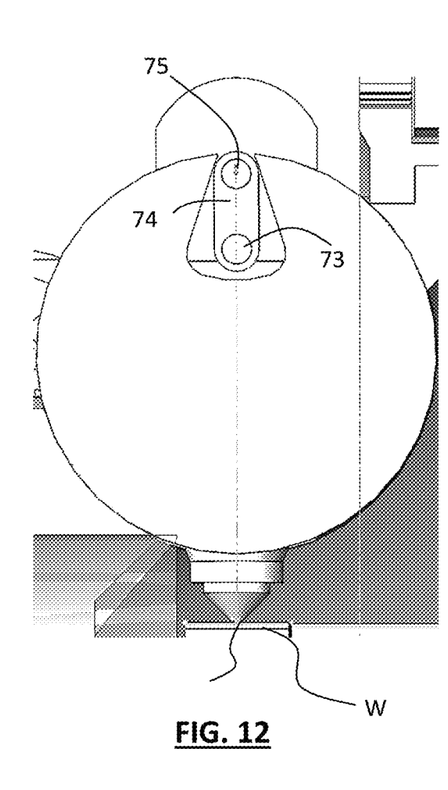
FIG. 12 is a second detailed view of the link mechanism of FIG. 11.
Figure 13:
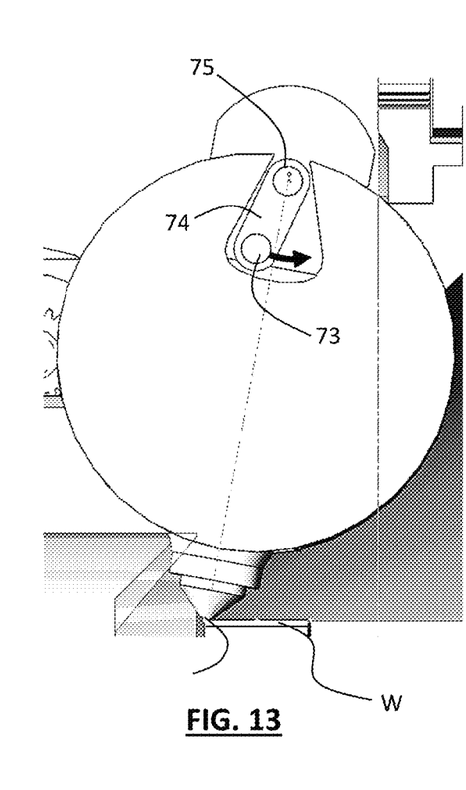
FIG. 13 is a third detailed view of the link mechanism of FIG. 11.
Figure 14:
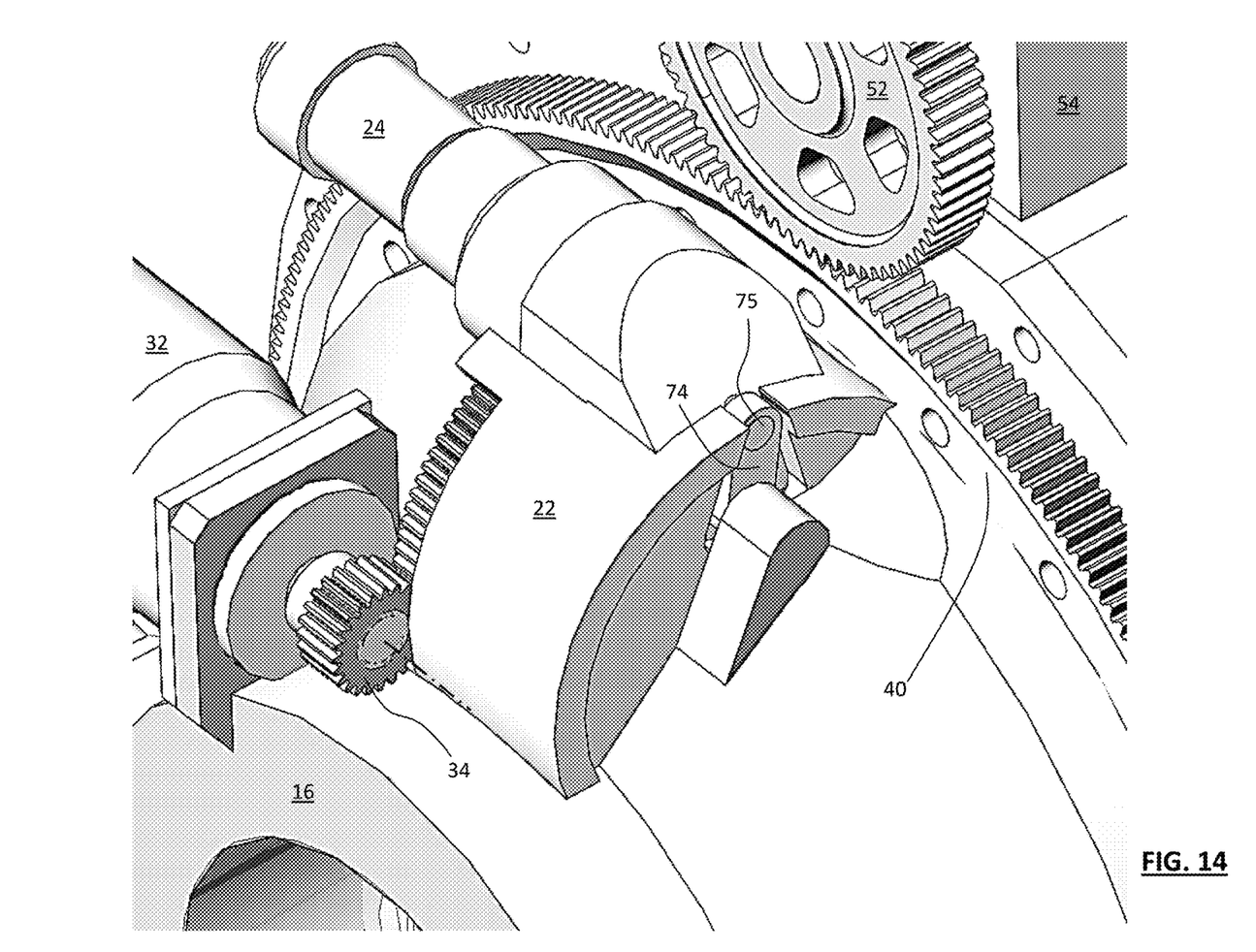
FIG. 14 is a close up perspective view of the link mechanism of FIG. 11.

Turning now to FIGS. 4, 9 and 10 a clamping system 60 of the apparatus 10 will be described in detail.

In particular, as shown in FIG. 4 the workpiece W has been received within the apparatus 10 via opening 13. For instance, the clamping system 60 can be provided in an open or "unclamped" configuration while the workpiece W is axially fed through the opening 13 into the apparatus 10 (see for example FIG. 9).

Once the workpiece W is inside, actuators 62 (i.e., pneumatic cylinders, servomotors, or other electrical or electro-mechanical actuators) can be used to activate the clamps 64 and contact the sides of the workpiece W, securing it in place (see for example FIG. 10).

In general, the inner face of the clamps 64 can be sized and shaped to engage securely with the workpiece W, and may be shaped in particular with a V-configuration to align the workpiece W in a desired location.

As shown, the clamps 64 may be pivotally coupled to upper mounts 66 via pin joints 67. The upper mounts 66 may be secured to the inside of the housing 14. In some cases, cooperating gear elements 68 can help ensure smooth clamping and ensure the workpiece W is centered.

Once the workpiece W has been clamped by the clamps 64, the main motor 56 can be activated to rotate the cutting heads 21 (i.e., the laser cutting tips) to circumnavigate the workpiece W. In this manner, the workpiece W can be cut into manageable sized pieces.

After cutting of the workpiece, the clamps 64 can be opened and the cut portion of the workpiece W will be released. In some embodiments, this cut portion may fall via the operation of gravity into a shielded waste container located below the apparatus 10. In particular, the apparatus 10 may have an opening in the bottom thereof that is in communication with a shielded waste container. Once the cut portion is released by the clamps 64, it can simply fall into the container.

In some embodiments, the opening in the bottom of the apparatus 10 may have a movable cover or door, which can be opened to allow the cut portion of the workpiece W to pass into the waste container.

In some embodiments, the cut portion of the workpiece W could be removed via other methods.

Turning now to FIGS. 11 to 14, in some embodiments it may be desirable to maintain a relatively constant standoff or spacing between the workpiece W and the cutting head 21 during axial movement of the cutting head 21 (i.e., during movement caused by the axial drive units 30 as shown for example in FIGS. 5 and 6). This may be desirable for example to help ensure quality and reliability of the cutting operation of the workpiece W.

To this end, the cutting heads 21 can be operable to move radially (with respect to the main axis A) as they are moved axially forwards and backwards by the axial drive units 30. For example, each puck 22 could include a slot 25 therein. A link member 74 could be pinned to the cutting body 23 and the cutter housing 24 via pin joints 73, 75. This link member 74 would allow the cutting head 21 to move slightly outwardly and inwardly (in the radial direction) as the cutting head 21 is moved axially forwardly and rearward, maintaining a relatively constant standoff between the workpiece W tube and the tip of the cutting head 21, regardless of the angle of the cutting body 23.

Various apparatus and methods as described herein may provide for one or more benefits, some of which are listed below. In particular, volume reduction of irradiated workpieces may be accomplished using non-contact cutting methods, such as laser cutting. In this manner, high tonnage presses and intricate mechanical dies are not required.

The teachings herein are also generally suitable for working with servomotors or other electric motors. This generally eliminates the need for extensive hydraulic systems and supply. This can facilitate ease of installation (including increasing installation speed) and eliminates leaks and a potential fire hazard.

At least some of the teachings herein are directed towards apparatus with relatively high reliability. Cutting using laser cutting and other contactless techniques tends to be reliable and predictable, particularly since the cutting elements do not undergo mechanical wear. In contrast, mechanical press and die based volume reduction systems tend to require intricate mechanical dies that experience mechanical wear and have limited life.

At least some of the teachings herein may provide for high cutting speeds of irradiated workpieces. In particular, the processing rate of some apparatus may be about twice as fast (or even faster) as compared to existing mechanical systems.

At least some of the teachings herein may provide for a compact apparatus, in some cases less than half of the size of other volume reduction systems. More particularly, in some cases, volume reduction apparatus made according to the teachings herein may be approximately ¼ of size of current volume reduction machines, in both volume and mass. This reduction in both size and weigh may allow apparatus to be mounted on worktables and may significantly simplify the processing of irradiated materials.

Volume reduction using non-contact methods also prevents formation of a flattened section during press operation (i.e., a "duck-bill"), which might otherwise jam a pipe or other material in a mechanical press (and which would require additional contingency shears for dealing with jams).

The teachings herein also provide for apparatus where powered components such as laser connections, motors and drives are located outside of the shielding housing. This provides for ready access thereto by an operator (i.e., for repair or inspection), while reducing the relative radiation exposure of such operator.

According to some of the teachings herein, the standoff between the pipe or workpiece and the tip of a laser cutting head can be maintained at a relatively constant distance, regardless of angle. This tends to ensure quality and reliability of the cutting operation while eliminating the need for one or more additional drive mechanisms.

The present embodiments have been described here by way of example only. Various modification and variations may be made to these exemplary embodiments without departing from their scope, which is limited only by the appended claims.

The invention claimed is:

1. An apparatus for volume reduction of material removed from a nuclear facility, comprising:
   a. a shielded housing for receiving therein an irradiated-workpiece from the nuclear facility, the housing including radiation shielding to shield an adjacent space from radiation from the workpiece that would limit the amount of time that a person could spend in the adjacent space;
   b. at least one cutting unit having a cutting head contained within the shielded housing and operable for contactless cutting within the shielded housing; and
   c. a drive unit for rotating the at least one cutting unit around a main axis so the cutting head cuts the workpiece within the shielded housing.

2. The apparatus of claim 1, wherein an end of the apparatus includes an opening that is sized and shaped to receive the workpiece therein.

3. The apparatus of claim 2, wherein the opening is sized and shaped to impede egress of irradiated materials from within the apparatus during and after cutting of the workpiece.

4. The apparatus of claim 1, further comprising an end portion rotatably coupled to the shielded housing.

5. The apparatus of claim 4, wherein the end portion comprises a ring gear, the drive unit is coupled to the shielded housing, and the ring gear is operable to engage with the drive unit to rotate the end portion relative to the shielded housing.

6. The apparatus of claim 1, further comprising at least one axial drive unit for moving the cutting head axially within the housing.

7. The apparatus of claim 6, wherein each cutting unit includes a geared portion sized and shaped to engage with a drive gear on at least one of the axial drive units to convert rotary motion of the drive gear into linear axial motion of the cutting head.

8. The apparatus of claim 1, further comprising a clamping system for securing the workpiece within the shielded housing during cutting.

9. The apparatus of claim 1, further comprising a link mechanism for maintaining the cutting head in a constant standoff relative to the workpiece.

10. The apparatus of claim 1, wherein the at least one cutting head comprising a laser cutter.

11. The apparatus of claim 1, wherein the at least one cutting head comprises a plasma torch.

12. The apparatus of claim 1, wherein the at least one cutting head includes two cutting heads.

13. The apparatus of claim 1, wherein the drive unit is operable to rotate the at least one cutting unit in a first direction and a second direction.

14. A method of volume reducing an irradiated workpiece, comprising:
   a. receiving within a shielded housing the irradiated workpiece from a nuclear facility, the housing including radiation shielding to shield an adjacent space from radiation from the workpiece that would limit the amount of time that a person could sp ad in the adjacent space, the shielded housing also containing a contactless cutting head of a cutting unit; and b. rotating the cutting unit around a main axis so that the contactless cutting head cuts the irradiated workpiece within the shielded housing.

15. The method of claim 14, further comprising clamping the irradiated workpiece within the shielded housing during cutting.

16. The method of claim 15, further comprising unclamping the irradiated workpiece after cutting, and collecting a cut workpiece in a shielded waste container.

17. The method of claim 14, further comprising moving the cutting head axially within the shielded housing.

18. The method of claim 17, further comprising moving the cutting head radially during axial movement thereof to maintain a constant standoff between the workpiece and the cutting head.

19. An apparatus for volume reduction of used material removed from a nuclear facility, comprising:

a. a shielded housing for receiving therein an irradiated workpiece of the used material from the nuclear facility, the housing including radiation shielding to shield an adjacent space from radiation from the workpiece resulting from use of the workpiece in the nuclear facility;

b. at least one cutting unit having a cutting head contained within the shielded housing and operable for contactless cutting within the shielded housing; and c. a drive unit for rotating the at least one cutting unit around a main axis so the cutting head cuts the workpiece within the shielded housing.

20. The apparatus of claim 19, wherein the shielded housing encloses an interior chamber and includes a sidewall extending between a first end wall at a first end of the interior chamber and a second end wall at a second end of the interior chamber opposite the first end, the first end wall including an opening to receive the workpiece within the shielded housing, and the second end wall closing the second end.

\* \* \* \* \*